March 4, 1958 S. G. ESKIN 2,825,507
TEMPERATURE ADJUSTMENT FOR THERMOSTATS
Filed Feb. 25, 1955 3 Sheets-Sheet 2

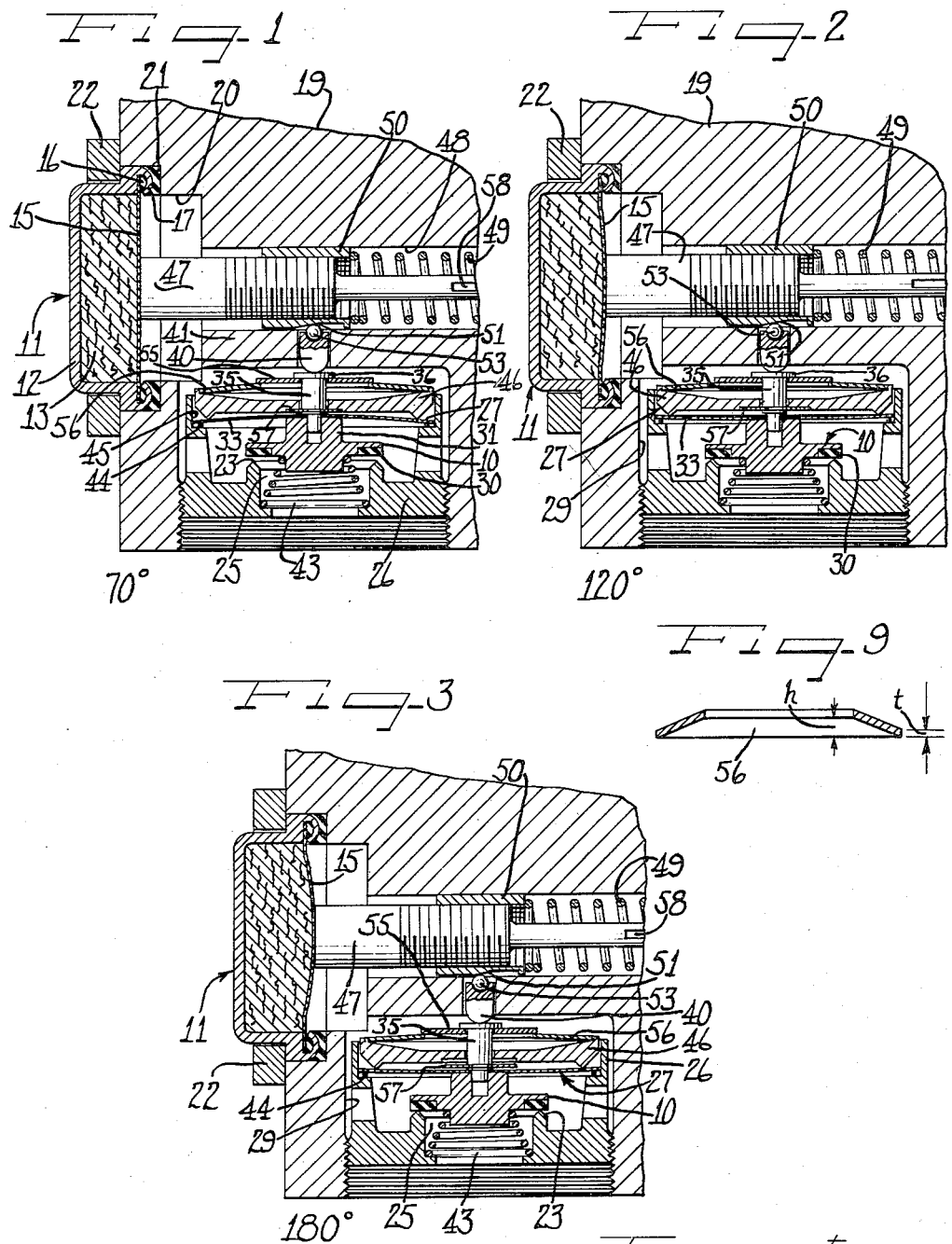

70°

120°

180°

Inventor
Samuel G. Eskin

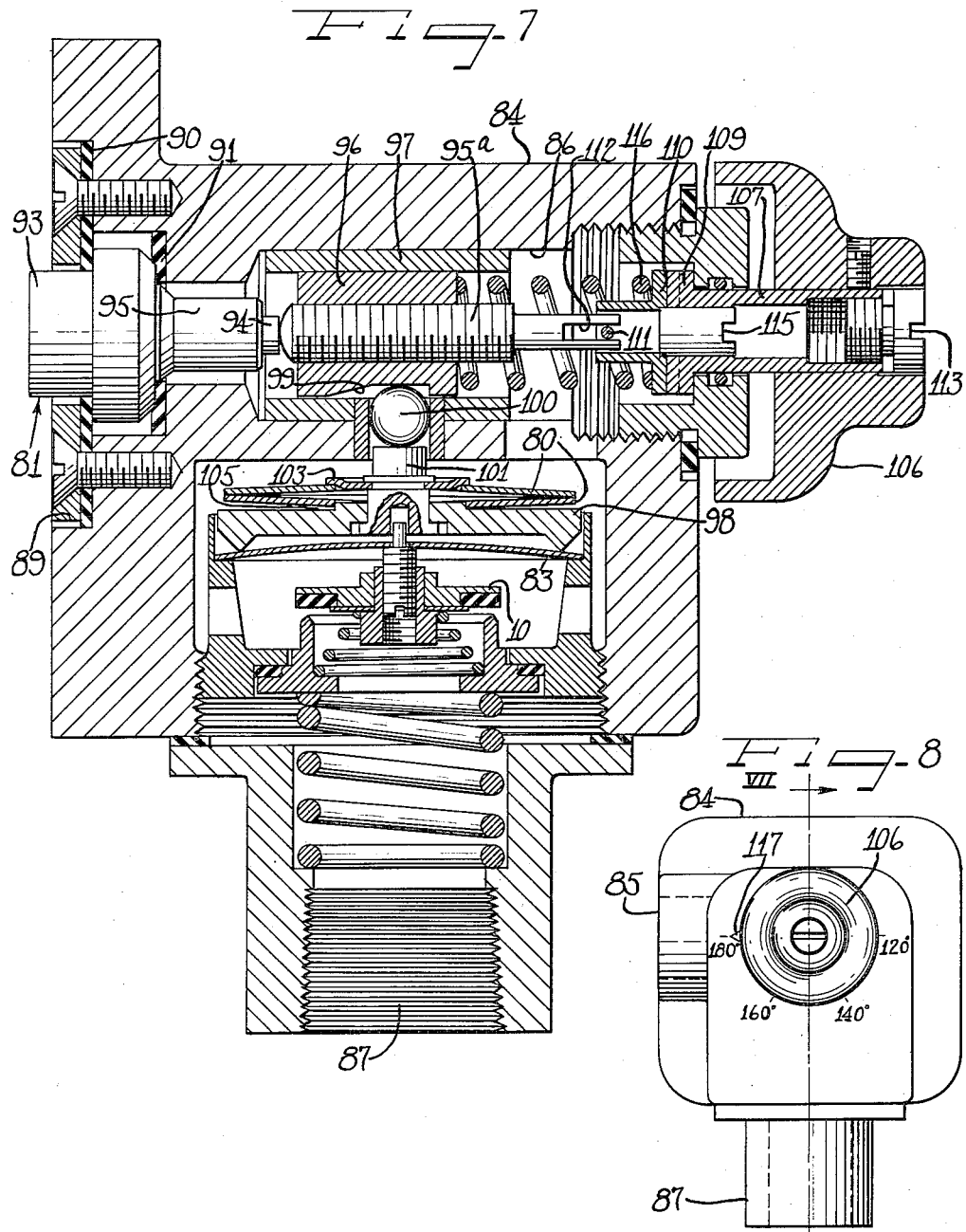

United States Patent Office 2,825,507
Patented Mar. 4, 1958

2,825,507

TEMPERATURE ADJUSTMENT FOR THERMOSTATS

Samuel G. Eskin, Chicago, Ill., assignor to The Dole Valve Company, Chicago, Ill., a corporation of Illinois Application February 25, 1955, Serial No. 490,642

8 Claims. (Cl. 236—48)

This invention relates to improvements in thermostats and more particularly relates to a new and improved temperature adjustment means for thermostats.

Thermal elements of the so-called power or wax filled and liquid charged bellows type have frequently been used to operate valves and like devices to be operated with a snap action. While such elements have been exceedingly reliable and have operated successfully, it has been difficult to adjust the thermostat to provide an adjustment for the operating range of the thermostat which will not overload the snap action mechanism upon over travel such as is encountered when changing the temperature setting of the thermostat.

It has been found that if a preloaded spring is provided in the drive from the thermal element to the device to be operated, and that if this spring is of a type which has a relatively large deflection with a very little increase in load on the thermal element, that the drive from the thermal element may be adjustable to vary the operating range of the thermostat without damage to the snap action mechanism.

It is, therefore, a principal object of my invention to provide a temperature adjustment means for thermostats utilizing a power type of thermal element in which a spring is included in the drive from the thermal element to a valve or like device, which is capable of relatively large deflection without materially increasing the load on the drive mechanism to the valve.

Another object of my invention is to provide an adjustable thermostat in which adjustment of the travel and operating range of the thermal element is accommodated by the provision of a coned disk spring in the drive from the thermal element to the device to be operated.

Another object of my invention is to provide a thermostat having a power type of thermal element for operating a snap acting device upon certain predetermined temperature conditions and accommodating adjustment of the thermal element by the use of a coned disk spring in the drive from the thermal element, preloaded to refrain from deflection until overloading occurs.

Still another object of my invention is to provide a thermostat using a wax filled thermal element in which temperature adjustment and over-temperature conditions are compensated for by the use of one or more coned disk springs in the drive from the thermal element, preloaded to act as solid drive members under normal temperature conditions, and to deflect relatively large amounts with little increase in load on the thermal element when over-temperatures occur.

Another and more specific object of my invention is to provide a simple and inexpensive adjustable thermostat utilizing a power type of thermal element for driving a snap acting drive mechanism in which the drive from the thermal element to the snap acting drive mechanism is a right angle cam and follower drive and in which adjustment of the operating range of the thermostat is accommodated by varying the travel of the thermal element necessary to bring the cam into operating engagement with the follower, and by placing a preloaded coned disk spring in the drive from the thermal element to the snap acting drive mechanism.

These and other objects of my invention will appear from time to time as the following specification proceeds and with reference to the accompanying drawings wherein:

Figure 1 is a fragmentary sectional view taken through a valve, showing a thermal element and an adjustable drive connection from the thermal element to snap acting drive mechanism for operating the valve with the thermal element and valve in the positions they will assume at normal room temperatures of 70° when the thermostat is set to close the valve at 120°;

Figure 2 is a view somewhat similar to Figure 1 but showing the thermal element and valve in the positions they will assume at a temperature of 120° with the thermostat set to close the valve at 120°;

Figure 3 is a view like Figures 1 and 2 and showing the thermal element, valve and thermally operated snap acting operating mechanism for the valve in the positions they will assume at temperatures of substantially 180° when the thermostat has been set to close the valve at 180° F. and then has been set back to 120° F.;

Figure 7 is a transverse sectional view taken through a modified form of valve constructed in accordance with my invention;

Figure 8 is a plan view of the valve shown in Figure 7; and

Figure 9 is a cross sectional view of a coned disk spring, such as is used to accommodate adjustment of the thermostat.

Figure 4:
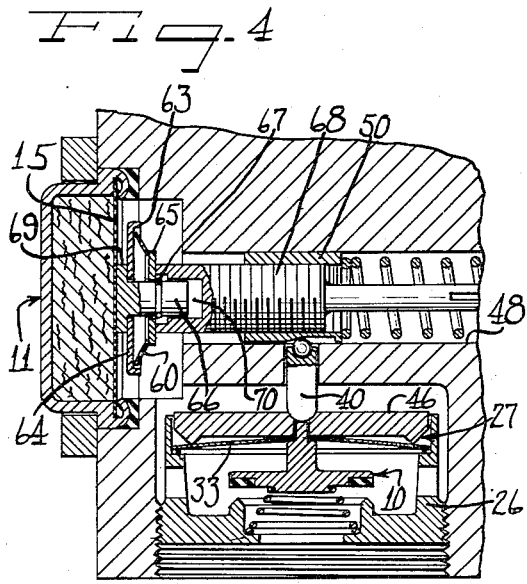
Figure 4 is a view somewhat similar to Figure 1 and illustrating a modified form in which my invention may be embodied.

In Figures 1, 2 and 3 of the drawings, I have shown an adjustable thermostat in which a snap acting valve 10 is operated by a wax filled thermal element 11, herein shown as being a disk-type of thermal element such as is shown and described in my joint application with Joseph M. Algino, Serial No. 367,395, filed July 13, 1953. It is, of course, understood that the thermal element need not be a wax filled type but may be a liquid filled bellows type of element or any other type of power thermal element desired.

The thermal element 11 is herein shown as comprising a flanged casing 12 containing a fusible material 13, which may be a micro-crystalline wax, a powdered metal and a binder, or may be a micro-crystalline wax and a metal wool, or a wax alone. The fusible material 13 is retained to the casing 12 by a thin metal diaphragm 15 sealed thereto by an annular sealing member 16, shown as engaging the outer peripheral margin thereof and engaged with the diaphragm 15 by an inwardly curled flanged portion 17 of the casing 12.

The thermal element 11 is shown as extending partially within a valve body 19 in association with a shouldered opening 20 leading thereinto and sealed to said valve body by an annular seal 21 sealed on the shoulder of the shouldered opening 20 and engaging the bent over flanged portion of the casing 12. A yoke 22 engaging the outside of the flanged portion of the casing 12 and bolted or otherwise secured to the valve body 19 is provided to maintain the thermal element 11 in sealing engagement with the valve body.

The valve 10 is shown as being a snap acting valve of the type used to control the flow of gas to a hot water heater or like device, although it may be used for any control purpose desired. The valve 10 is like that shown in my application Serial No. 452,142, filed August 25, 1954, now Patent No. 2,774,541, and entitled "Thermostatically Operated Shut-Off Valve," and is engageable with an annular valve seat 23, the inner margins of which define a port 25 leading through a support 26 for snap acting drive operating mechanism 27, for snapping the valve 10 closed upon operation of the thermal element 11 by fusion of the fusible material contained therein. The support 26 is shown as being threaded within an outlet chamber 29 which may have connection with a gas burner or the like. The valve 10 has a resilient annular valve face 30 engaging with the seat 23 and has a central boss 31 extending axially in opposite directions with respect to the valve face 30. The boss 31 is drilled at its inner side and is abutted by a snap acting disk 33. The drilled portion of the boss 31 is slidably carried on a reduced diameter portion of a shouldered pin 35. The shouldered pin 35 extends through a washer 55, the snap acting disk 33 and a fulcrum member 46 and has a head 36 at its inner end engaging the washer 55. The head 36 is engaged by a plunger 40 slidably guided in the wall 41 of the valve 19. The shouldered pin 35 is retained to the fulcrum member 46 as by a snap washer 57. A spring 43 seated within the port 25 serves to bias the valve 10 into an open position.

The snap acting disk 33 is shown as engaging an annular wire 44 in a shouldered wall portion 45 of the support 26. The wire 44 forms a fulcrum for said disk. The opposite face of the disk 33 is engaged by an annular fulcrum of the fulcrum member 46, spaced inwardly of the wire 44. The shouldered pin 35 extends through the center of the fulcrum member 46 and is relatively movable with respect thereto.

The drive from the power member or flexible diaphragm 15 of the thermostatic element 11 to operate the snap acting disk 33 to snap the valve 10 closed includes a plunger 47 engaged with the outer face of the diaphragm 15 by a spring 49, seated at its inner end on a cam member 50 and at its outer end on a suitable closure (not shown) closing the end of the chamber 48, as in my application Serial No. 452,142, and no part of my present invention so not herein shown or described. The cam member 50 is shown as being threaded on the plunger 47 and as having a recessed sloping cam face 51 engaging a ball 53 on the outer end of the operating member 40. The cam member 50 may be held from turning movement with respect to the plunger 47 upon turning movement of said plunger to adjust the operating range of the thermostatic element in any suitable manner. For example, the cam member 50 may have a flat face (not shown) extending therealong having slidable engagement with a similar flat face (not shown) in the passageway 48, or may be retained from rotation in any other suitable manner to effect linear movement of said cam along the plunger 47 upon turning movement of said plunger.

The operating member 40 is shown as having a rounded outer end engaging the head 36 of the shouldered pin 35 to depress the same upon rectilinear movement of the cam member 50 and the riding of the ball 53 outwardly along the cam face 51. The washer 55 is seated adjacent its periphery on the inner annular edge of a coned disk spring 56. The coned disk spring 56 in turn is seated within the fulcrum member 46, to move said fulcrum member to snap the disk 33 past center and snap the valve 10 closed upon operation of the shouldered pin 35 by the operating member 40, as the cam member 50 is extended along the passageway 48.

The coned disk spring 56 is commonly called a Belleville spring and its characteristics are such and it is so loaded that it will stay in its normal position as shown in Figures 1 and 2 during normal valve closing movement and will deflect toward the valve 10 a relatively great amount with a little increase in load on the thermal element 11 upon over-travel thereof, caused by over-temperature conditions.

It should here be understood that adjustment of the thermostat to operate at the desired temperature range may be attained by turning of the plunger 47 as by a knob (not shown) having driving connection with a slot 58 in a reduced end portion of said plunger and turning the same to vary the position of the sloping cam face 51 with respect to the ball 53, and thus to vary the length of travel of the plunger 47 necessary to snap the snap acting disk 33 past center and effect closing of the valve 10.

Thus, when it is desired that the valve close at a low temperature range, the cam is adjusted with respect to the plunger 47 to a position similiar to that shown in Figure 1 in which the thermostat is adjusted to close the valve 10 at temperatures of 120° F. When the cam is in this position, the ball is partially riding along the sloping surface 51. It therefore, requires very little travel of the plunger 47 and cam surface 51, to depress the ball 53 and operating member 40 to effect closing of the valve with a snap action.

It will further be noted from Figure 2 showing the thermal element 11 heated to 120° F. with the cam 50 set to close the valve when the temperature of the medium to which the thermostatic element 11 is subjected reaches 120° that the coned disk spring 56 is in its normal preloaded condition and that the connection between the operating member 40 and fulcrum member 46 is in effect a rigid connection, since the spring has not yet come into action.

In Figure 3, however, the thermal element 11 is shown as being heated to 180° F. In this figure, the cam member 50 and the sloping cam face 51 have been set to close the valve 10 at a temperature of 180° F. After the thermostatic element has been subjected to the temperature of 180° F. the cam member 50 and sloping cam face 51 have been reset to 120° as by turning of the temperature adjusting knob (not shown) on the outside of the valve body. When cam 50 is in the position shown in Figure 3 and the temperature to which the thermal element 11 is subjected is substantially 180°, the overload is taken up by the coned disk spring 56, the amount of the deflection of the spring 56 being indicated by the space between the snap washer on the shouldered pin 35 and the fulcrum member 46.

The coned disk spring or Belleville spring 56 is preloaded to a force of a few pounds greater than the force required to operate the snap action mechanism to snap the valve 10 closed. There will, therefore, be no deflection of the spring during normal closing of the valve, when the valve closes at the temperature for which the thermostat is set and the temperature of the hot water or other medium to which the thermal element 11 is subjected immediately decreases. If, however, for some reason or another, the temperature to which the thermal element 11 is subjected should remain at the initial setting of the thermostat and the thermostat should then be set to operate at a lower temperature range, over-travel of the pin 35 will occur due to the fact that the ball 53 will be moved farther upwardly along the cam 51. The coned disk spring 56 will then deflect. Upon deflection of the coned disk spring movement of the shouldered pin 35 is obtained wtih respect to the fulcrum member 46, without any amount of increase in load on the snap acting mechanism 27 operated by the thermal element 11.

It has been found that a force of approximately 35 lbs. is required to operate the snap action mechanism and that the cone disk spring 56 should be preloaded to a force of a few pounds greater than the force required to operate the snap acting mechanism. The coned disk spring 56 therefore will only deflect after operation of the snap acting mechanism and has characteristics wherein after a certain initial deflection of the spring as the spring is preloaded the load remains substantially constant for a considerable amount of further deflection. The coned disk spring 56 thus allows movement of the shouldered pin 35 without imposing excessive loads on the snap acting mechanism or thermal element 11.

It has further been found that a suitable coned disk spring having the desired characteristics of large deflection with little increase in load may be one in which the ratio of the free-height ($h$) to the thickness ($t$) of the spring is approximately 2.1 as indicated on pages 52 and 53 of the "Handbook of Mechanical Spring Design" published by the Associated Spring Corporation.

Figure 5:
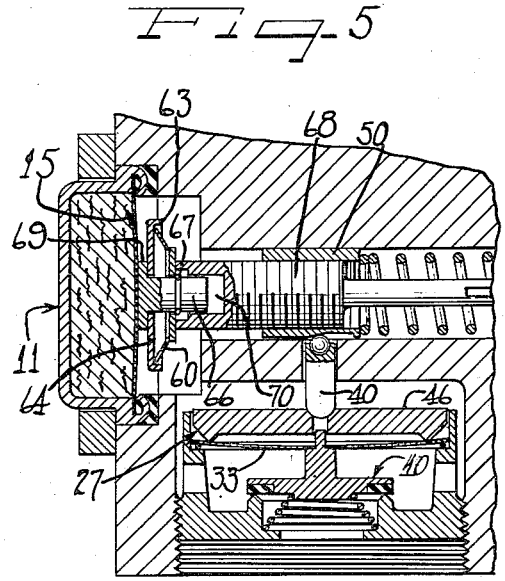
Figure 5 is a view like Figure 4, but showing the thermal element and parts operated thereby in the positions they will assume at temperatures of 120° with the thermostat set to close the valve at 120°.
Figure 6:
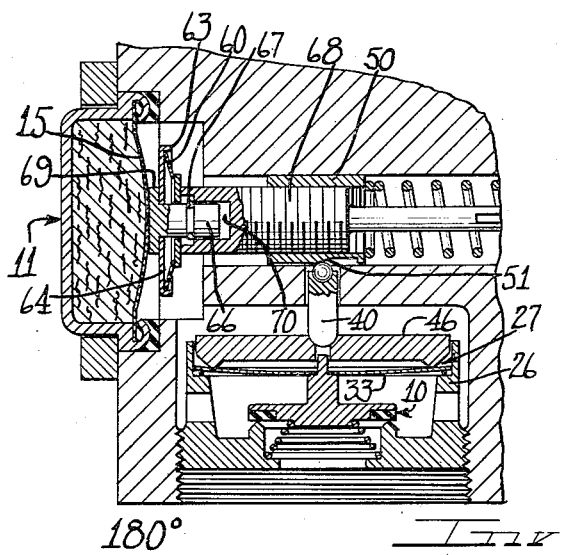
Figure 6 is a view similar to Figure 4 but showing the positions of the thermal element and parts operated thereby in the positions they will assume at 180° F. when the thermostat has been set to close the valve at 180° F. and then has been set back to 120° F.

In Figures 4, 5 and 6 I have shown a valve 10 and operating mechanism therefor including a thermal element 11 which are of the same general form as shown in Figures 1, 2 and 3. The same reference characters will therefore be applied to the same parts and located in the same general relation as in Figures 1, 2 and 3, new reference characters only being applied to the different parts or to similar parts in different locations.

In the form of my invention shown in Figures 4, 5 and 6 a coned disk or Belleville spring 60 is shown as being interposed between the diaphragm 15 of the thermal element 11 and a plunger 68 for operating the valve 10, instead of between the operating member 40 and fulcrum member 46, as in the form of my invention shown in Figures 1, 2 and 3.

The coned disk spring 60 is shown as engaging within an annular shoulder 63 of a retainer 64 at its base. The small diameter end of the coned disk spring 60 is shown as abutting a washer 65 encircling a shaft 66, and retained to said shaft as by a snap ring 67. The shaft 66 extends through the retainer 64 and has a head 69 abutting the flexible metallic diaphragm 15 of the thermal element 11 and forming an abutment member, abutting the retainer 64 to retract the plunger 68 along the passageway 48 upon fusion of the thermally expansible fusible material of the thermal element.

The shaft 66 is shown as extending within a hollow end portion 70 of the plunger 68 to accommodate relative movement of said shaft with respect to said plunger upon deflection of the coned disk spring 60, as shown in Figure 6.

In this form of my invention the thermal element 11 and diaphragm 15 thereof are shown in the positions they will assume at temperatures of 70° F., 120° F. and 180° F. with the thermostat set to snap the valve 10 closed at a temperature of 120° F.

It will be seen that in this form of my invention, like the form of my invention shown in Figures 1, 2 and 3, that the coned disk spring 60 being preloaded slightly above the force required to operate the snap acting mechanism to close the valve 10, that there will be no deflection of the coned disk spring during normal valve closing movement and that the only deflection of the spring will be upon overload conditions as when the thermostat has been reset to operate at a lower temperature than the temperature to which the thermal element is subjected at the time of resetting it. Thus, when the cam 50 has been reset from an operating range of 180° to an operating range of 120° and the thermal element is subjected to a temperature of 180° the spring 60 will deflect and accommodate movement of the shaft 66 within the hollow end 70 of the plunger 68, without any material increase in load on the snap acting valve closing assembly or the thermal element operating the same.

Figure 7 shows still another form in which my invention may be embodied. In this form of my invention, two coned disk springs 80 are connected in series and a so called Vernet type of wax or power of thermal element 81 is provided to operate a snap acting mechanism 83 to close the valve 10.

In this form of my invention I have shown a valve body 84 having an inlet 85 leading into said body and having communication with a chamber 86 extending along said valve body and having an outlet 87 leading from said valve body for supplying gas to a main gas burner or like device, under the control of the snap acting valve 10.

The snap acting valve 10 and snap acting mechanism 83 for snapping said valve closed, are of the same general form as shown in Figures 1 through 6, so a detailed description thereof need not herein be repeated.

The thermal element 81 is retained to the valve body 84 by an annular retainer 89 and is sealed thereto as by seals 90 and 91. The thermal element 81 has a casing 93 containing a fusible material, fusible at the operating range of the thermal element for extending a power member 94 from a cylinder 95, upon fusion of the fusible thermally expansible material.

The power member 94 is shown as abutting a plunger 95a having a cam member 96 threaded thereon and slidably guided in a guide 97 within the chamber 86. The guide 97 may be of an irregular form and the cam member 96 may conform to a form of the guide, to hold said cam member from rotation upon turning of the plunger 95a, to adjust the operating range of the thermostat.

The cam member 96 has a recessed sloping cam face 99 therein engaging a ball 100 for moving an operating member 101 at right angles to the path of movement of the power member 94. The operating member 101 is shown as having a retaining washer 103 thereon, which may be snapped thereto and engages the inner margin of the inner coned disk spring 80. The inner margin of the outer or series coned disk spring 80 is shown as engaging a shouldered portion 105 of a fulcrum member 98 for the snap acting mechanism 83.

Adjustment of the operating range of the thermostat is shown as being attained by an adjusting knob 106 on the outer end of a hollow shaft 107 and on the outside of the valve body 84. The hollow shaft 107 has an integrally formed jaw clutch member 109 at its inner end, having engagement with a jaw clutch member 110, for turning the same upon turning movement of the knob 106. The jaw clutch member 110 is shown as being hollow and as having a pin 111 extending through the hollow portion thereof. The pin 111 in turn extends within a slot 112 formed in the plunger 95a for turning the same upon turning of the knob 106. A machine screw 113 as threaded within the outer end of the hollow shaft 107 and may be removed to afford access to a screw 115 secured to the end of the jaw clutch member 110, to accommodate disengagement of the clutch formed by the jaw clutch members 109 and 110 against a return spring 116, and thus to accommodate adjustment of the position of the cam member 96 along the plunger 95a independently of the knob 106 when it is desired or required to set the cam 96 with respect to the plunger or to calibrate the thermostat to operate in accordance with the setting of the knob 106. The knob 106 is shown as having an indicator 117 thereon indicating the temperature setting of the thermostat, as seen in Figure 8.

The operation of the thermostat through the series coned disk springs 80 is the same as that described with regard to Figures 1 through 6. In this form of my invention, however, the power member 94 has a far greater travel than in the form of my invention show in Figures 1 through 6. The series coned disk springs 80 thus are preloaded like the single coned disk spring 56 shown in Figure 1, to accommodate closing of the valve 10 by the snap action mechanism 83 without deflection of the coned disk springs 80 and to deflect upon pressure greater than the range of preloading of said springs, and thus to accommodate over-travel of the operating member 101, upon resetting of the thermostat to operate at a lower temperature range than the temperature to which the thermal element may be subjected, without any pronounced increase in load on the snap acting operating assembly for snapping the valve 83 shut.

It may be seen from the foregoing that a simple and efficient form of adjustable thermostat has been provided, rendering power types of thermostatic elements of the wax or liquid filled type adjustable to operate at the desired temperature range and to be set back, while subjected to a higher temperature than the temperature range of the new setting and that this is attained by a simple form of yieldable drive connection between the thermal element and the snap acting mechanism operated thereby, which yields only upon over-load conditions, and when yielding does not materially increase the load on the snap acting operating assembly or thermal element operating the same.

It will be understood that various modifications and variations of the present invention may be effected without departing from the spirit and scope of the novel concepts thereof.

I claim as my invention:

1. In an adjustable thermostat, a thermal element having an extensible power member, snap acting drive mechanism, a positive drive connection from said power member to said snap acting drive mechanism including a rectilinearly movable plunger engageable with said power member, a cam member adjustably mounted on said plunger, means adjusting the position of said cam member with respect to said plunger and power member to vary the operating range of the thermostat, and means accommodating adjustment of said cam member to operate said snap-acting mechanism at a lower temperature range than the temperature range at which said cam member is set, after operation of said snap-acting drive mechanism without damaging said snap-acting drive mechanism, comprising a coned disk spring in the drive connection between said power member and said snap-acting drive mechanism, capable of a certain initial deflection upon overload conditions and of a relatively large deflection thereafter upon continued overload conditions with a relatively small increase in load on the snap-acting drive mechanism.

2. In an adjustable thermostat, a thermal element of a type having a casing containing a thermally expansible fusible material and having a power member extensibly movable with respect to said casing upon fusion of the fusible material contained therein, snap acting drive mechanism, a drive connection from said power member to said snap acting mechanism including a rectilinearly movable plunger engageable with said power member, a cam member adjustably mounted on said plunger, means adjusting the position of said cam member with respect to said plunger and power member to vary the operating range of the thermostat, and a coned disk spring interposed between said cam member and snap acting drive mechanism and loaded slightly greater than the load required to operate said drive mechanism and capable upon overload conditions of a relatively large deflection with a relatively small increase in load on said snap acting mechanism and thermal element.

3. In an adjustable thermostat, a thermal element of a type having a casing containing a thermally expansible fusible material and having a power member extensibly movable with respect to said casing upon fusion of the fusible material contained therein, snap acting drive mechanism, a drive connection from said power member to the device to be operated including a rectilinearly movable plunger engageable with said power member, a cam member adjustably mounted on said plunger, means adjusting the position of said cam member with respect to said plunger and power member to vary the operating range of the thermostat, and a coned disk spring interposed between said power member and said plunger and loaded slightly greater than the load required to operate the snap acting drive mechanism and capable upon overload conditions of a relatively large deflection after a predetermined initial deflection, with a relatively small increase in load on said snap acting mechanism and thermal element.

4. In an adjustable thermostat, a thermal element having an extensible power member, a snap-acting drive mechanism, an adjustable drive connection from said power member to said snap-acting drive mechanism including a rectilinearly movable plunger engageable with said power member, a cam member adjustably mounted on said plunger, means adjusting the position of said cam member with respect to said plunger and said power member to vary the operating range of the thermostat, and means accommodating adjustment of said cam member to operate said snap-acting mechanism at a lower temperature range than the temperature range at which said cam member is set, after said snap-acting drive mechanism has been operated, without damage thereto, comprising a plurality of coned disk springs in series in said drive connection to said snap-acting drive mechanism and loaded slightly greater than the load required to operate said snap-acting drive mechanism and capable of a relatively large deflection after a certain initial deflection with a relatively small increase in load in said drive connection upon overload conditions.

5. In an adjustable thermostat, a thermal element of a type having a casing containing a thermally expansible fusible material and having a power member extensibly movable with respect to said casing upon fusion of the fusible material contained therein, a snap-acting drive mechanism, a drive connection from said power member to said snap-acting drive mechanism including a rectilinearly movable plunger engageable with said power member, a cam member adjustably mounted on said plunger, a drive member operated by said cam member and having driving engagement with said snap-acting drive mechanism, means adjusting the position of said cam member along said plunger and with respect to said drive member to vary the operating range of the thermostat, and means accommodating adjustment of said cam member along said plunger to operate said snap-acting mechanism at a lower temperature range than the temperature range at which said cam member is set, after said snap-acting drive mechanism has been operated, without injury thereto, comprising a plurality of preloaded coned disk springs in series interposed between said drive member and snap-acting drive mechanism and loaded slightly greater than the load required to operate the snap-acting drive mechanism, and yieldable upon overload conditions with a relatively small increase in load on said snap-acting drive mechanism.

6. In a temperature adjustable thermostatically operated operating mechanism, a thermal element having a power member extensible upon predetermined temperature conditions, a plunger engaging said power member and rectilinearly moved thereby upon certain predetermined increases in temperature, a spring for returning said power member upon certain predetermined reductions in temperature, a snap acting drive mechanism, a cam member adjustably mounted on said plunger to vary the operating range of said thermostatic element, and a drive connection from said cam member to said snap acting drive mechanism accommodating adjustment of said cam member to a position to operate the snap acting mechanism at a lower temperature range than the temperature to which the thermal element is subjected without overloading the snap acting mechanism, comprising a preloaded spring of a type capable of a relatively large deflection after a predetermined initial deflection, without materially increasing the load on said snap acting mechanism and power member.

7. In a temperature adjustable thermostatic operating mechanism, a housing, a snap-acting drive mechanism within said housing and rectilinearly movable with respect to said housing upon operation thereof, a thermal element secured to said housing and having a power member movable in an axial direction at an angle with respect to the direction of rectilinear movement of said snap-acting drive mechanism, means operable by said power member for operating said snap-acting drive mechanism including a right angle drive between said power member and said snap-acting drive mechanism, means adjusting the position of said right angle drive with respect to said snap-acting drive mechanism to vary the temperature range of operation thereof, and means accommodating adjustment of said right angle drive to operate said snap-acting drive mechanism at a lower temperature range than the temperature range at which said right angle drive is set, after operation of said snap-acting drive mechanism, without overloading said snap-acting drive mechanism, comprising a coned disk spring preloaded to operate said snap-acting drive mechanism without deflection and deflecting upon predetermined overloads with relatively little increase in the load on said snap-acting drive mechanism.

8. In a temperature adjustable thermostatic operating mechanism, a housing, a thermal element having an extensible power member extensible along said housing upon predetermined increases in temperature, a snap acting disk within said housing, means for snapping said disk past center comprising a plunger engaged by same power member, an operating member within said casing guided for movement generally at right angles to the line of travel of said plunger, a cam on said plunger and having operative connection with said operating member to snap said disk past center upon extensible movement of said power member effected by predetermined temperature rises, means for varying the position of said cam along said plunger to vary the operating range of the thermal element, and a pre-loaded coned disk spring interposed between said cam and operating member for accommodating adjustment of said cam in a direction to operate said snap-acting disk after operation thereof while said thermal element is subjected to heat and has operated said snap acting disk to operate at a lower temperature range than the temperature to which said thermal element is subjected, without overloading said operating member and snap acting disk.

References Cited in the file of this patent

UNITED STATES PATENTS

| | | |
|---|---|---|
| 1,542,712 | Merrick | June 16, 1925 |
| 1,844,321 | Kay | Feb. 9, 1932 |
| 1,910,230 | Bastian | May 23, 1933 |
| 1,919,265 | Vaughn | July 25, 1933 |
| 2,295,427 | Puster | Sept. 8, 1942 |
| 2,532,896 | Dillman | Dec. 5, 1950 |
| 2,694,525 | Winet | Nov. 16, 1954 |

FOREIGN PATENTS

| | | |
|---|---|---|
| 370,125 | Great Britain | Apr. 7, 1932 |